United States Patent [19]

Grondin et al.

[11] Patent Number: 5,216,100
[45] Date of Patent: Jun. 1, 1993

[54] NON-TOXIC STABILIZING AGENT FOR AQUEOUS SUSPENSIONS OF SODIUM SILICO-ALUMINATES

[75] Inventors: Henri Grondin, Lyons; Jean Moro, Trevoux; Jacky Rousset, St-Trivier-sur-Moignans, all of France

[73] Assignee: Coatex S.A., Caluire, France

[21] Appl. No.: 803,788

[22] Filed: Dec. 6, 1991

Related U.S. Application Data

[63] Continuation of Ser. No. 629,696, Dec. 18, 1990, abandoned.

[30] Foreign Application Priority Data

Dec. 18, 1989 [FR] France .................. 89 17020

[51] Int. Cl.$^5$ .................. C08F 220/06; C08F 220/18
[52] U.S. Cl. .................. 526/318.4; 526/318.43; 526/318.44
[58] Field of Search .................. 524/450; 526/318.4, 526/318.43

[56] References Cited

U.S. PATENT DOCUMENTS 3,955,920  5/1976  Krauch et al. .................. 8/137
4,794,139  12/1988  Braden et al. .................. 524/117

FOREIGN PATENT DOCUMENTS

| | | |
|---|---|---|
| 1040 | 3/1979 | European Pat. Off. . |
| 207714 | 1/1987 | European Pat. Off. . |
| 242478 | 10/1987 | European Pat. Off. . |
| 280541 | 8/1988 | European Pat. Off. . |
| 317662 | 5/1989 | European Pat. Off. . |
| 61-101413 | 5/1986 | Japan . |
| 1153022 | 5/1969 | United Kingdom . |
| 2048841 | 12/1980 | United Kingdom . |

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Copolymers for stabilizing aqueous suspensions of sodium silico-aluminates or zeolites, which are crosslinked, soluble in water, at least at pH 7 or above, and consist essentially of:
a) at least one non-crosslinking acrylic monomer having a carboxylic function, chosen from among acrylic and methacrylic acids,
b) possibly at least one non-crosslinking acrylic monomer chosen from among the esters, amides and/or nitriles of acrylic and/or methacrylic acids,
(c) at least one crosslinking monomer having at least two acrylic and/or allyl and/or vinyl double bonds,
(d) possibly, at least one at least bifunctional crosslinking monomer comprising at most one double bond and at least one other chemical function that is reactive with regard to the other monomers with acid, amide or nitrile functions of the monomers of types (a) and (b),
the total amount of the crosslinking monomers of types (c) and (d) constituting from 1 to 5, preferably from 1 to 4 weight percent based on the total weight of the monomers, when used in a ratio of at most 0.4% by weight of dry substances in relation to the total mass of the suspension, are effective for preparing stable suspensions.

8 Claims, No Drawings

NON-TOXIC STABILIZING AGENT FOR AQUEOUS SUSPENSIONS OF SODIUM SILICO-ALUMINATES

This is a continuation of application Ser. No. 07/629,696, filed on Dec. 18, 1990, now abandoned.

BACKGROUND OF THE INVENTION

1. Field of the Invention

The present invention relates to stabilizing agents permitting the preparation of suspensions of sodium silico-aluminates, also known as zeolites, having good stability in storage and during transport, and aqueous suspensions of sodium silico-aluminates containing such agents.

2. Description of the Background

Sodium silico-aluminates are increasingly used in formulations for detergent compositions to replace polyphosphates, which are responsible, upon being discharged into the natural environment, for the phenomenon of eutrophication affecting lakes and rivers.

Currently, to facilitate their use at the time of manufacturing detergent compositions, these zeolites are increasingly supplied in the form of aqueous suspensions containing approximately 50% of anhydrous zeolites, which are required to possess good stability in the course of storage and during transport.

For a long time now, those skilled in the art have proposed adjuvants enabling stable suspensions of zeolites to be obtained. FR Patent No. 2,287,504 and EP Patent No. 294,694, for example, describe the preparation of suspensions of zeolites stabilized with surfactants belonging, in particular, to the family of $C_{16}$-$C_{18}$ fatty alcohols ethoxylated with 1 to 8 moles of ethylene oxide. This solution has the drawback of using very large quantities of stabilizing agent, on the order of 0.5 to 6% in relation to the suspension.

In FR Patent No. 2,512,690, the stabilizing agents mentioned are hydroxylated polymers obtained from starch, which prove efficient but which have to be used in large quantities, representing between 0.4 and 2.5% by weight and preferably between 1.4 and 1.5%, and which, in addition, because they are naturally biodegradable, necessitate the complementary addition of bactericides that are prejudicial to the environment at the time of discharge.

DE Patent No 3,021,295 describes a stable composition of zeolites containing 15% of nitrilotriacetic acid in salified form, a product the discharge of which is presently subject to strict regulations, and even prohibited in some countries.

FR Patents No. 2,455,479 and No. 2,461,516 claim as stabilizing agents polymers which have the drawback either of causing ammonia to be released in the highly alkaline medium (pH 10 to 13) of the zeolites in the case of FR Patent No. 2,455,479, or of failing to ensure good stability in the course of the preparation, storage and transport of the suspensions of zeolites at temperatures of between 50° C. and 60° C. (FR Patent No. 2,461,516).

Finally, JP Patent No. 61-101413 describes crosslinked styrene, sulfonated styrene and maleic anhydride based polymer compositions. These polymers are generally prepared in a solvent medium of the aromatic type, and such compositions will be difficult to obtain in a very pure state and pose the risk of them containing traces of solvent and styrene, a toxic monomer, which are sources of environmental pollution.

Thus, there, remains a need for agents, for stabilizing aqueous suspensions of sodium silico-aluminates, which do not suffer from the above-described drawbacks.

SUMMARY OF THE INVENTION

Accordingly, it is one object of the present invention to provide novel agents, for the stabilization of aqueous suspensions of sodium silico-aluminates in regard to storage and transport.

It is another object of the present invention to provide novel agents, for the stabilization of aqueous suspensions of sodium silico-aluminates, which are effective in small amounts.

It is another object of the present invention to provide novel agents, for the stabilization of aqueous suspensions of sodium silico-aluminates, which are non-toxic.

It is another object of the present invention to provide stable suspensions of sodium silico-aluminates which contain such agents.

These and other objects, which will become apparent during the following detailed description, have been achieved by the inventors' discovery that non-toxic crosslinked acrylic copolymers permit the preparation of aqueous suspensions of zeolites, the stability in storage of which is considerably improved, and, moreover, with doses of additive that are far smaller than in the case of products according to the prior art.

According to the present invention, the copolymers for stabilizing aqueous suspensions of zeolites are characterized in that they are crosslinked, soluble in water, at least at pH 7 or above, and consist essentially of:

(a) at least one non-crosslinking acrylic monomer having a carboxylic function, chosen from among acrylic and methacrylic acids;

(b) possibly, at least one non-crosslinking acrylic monomer chosen from among the esters, amides and/or nitriles of acrylic and/or methacrylic acids;

(c) at least one crosslinking monomer having at least two acrylic and/or allyl and/or vinyl double bonds; and (d) possibly, at least one at least bifunctional crosslinking monomer comprising at most one double bond and at least one other chemical function that is reactive with regard to the other monomers with acid, amide or nitrile functions of monomers of types (a) and (b);

in which the total amount of the crosslinking monomers of types (c) and (d) constitutes from 1 to 5, preferably from 1 to 4, weight percent based on the total weight of the monomers.

DETAILED DESCRIPTION OF THE PREFERRED EMBODIMENTS

According to the present invention, the acrylic monomer of type (b) can be chosen preferably from the group consisting of methyl, ethyl, propyl, butyl and octyl acrylates, as well as the corresponding methacrylates, acrylamide, acrylonitrile, or the corresponding methacrylic derivatives, N-substituted acrylamides or methacrylamides, such as N-mono- or di-$C_{1-4}$-alkylated derivatives of acrylamide or methacrylamide.

According to the present invention, the crosslinking monomer of type (c) having at least two double bonds is chosen preferably from the group consisting of ethylene glycol dimethacrylate, allyl acrylate, methylene-bis-acrylamide, tetrallyloxyethane, triallyl cyanurate, allyl ethers obtained from polyols such as pentaerythritol, sorbitol, sucrose, or others.

According to the present invention, the other reactive chemical function of the crosslinking monomer (d) can be chosen from among the hydroxyl, methylol, isocyanate, amine, epoxy, alkylene carbonate or other functions.

As products corresponding to this definition, mention can be made, for example, of ethylene glycol methacrylate or acrylate, methylol acrylamide, methylol methacrylamide, and glycidyl methacrylate.

The copolymer according to the invention can be obtained using any technique known to one skilled in the art, e.g., by radical or ionic polymerization, in solution, direct emulsion, reverse emulsion or in bulk or by polymerization by precipitation in an appropriate solvent.

The present copolymer may be prepared from a monomer mixture which contains, expressed in percent by weight in relation to its total mass:

a) the acrylic and/or methacrylic acids constituting advantageously from 15% to 99% of the monomer composition and preferably from 30% to 99% of this composition;

b) the non-crosslinking acrylic monomers chosen from among the esters, amides or nitriles of acrylic and/or methacrylic acids constituting advantageously from 0 to 85% of the monomer composition, and preferably from 0 to 60% of this composition; and c) the sum of the crosslinking monomers constituting from 1% to 5% of the monomer composition, and preferably from 1% to 4% of this composition.

The copolymer obtained according to the techniques known to one skilled in the art generally takes the form, depending on the polymerization process used, of an emulsion in water, or a powder, or a solution, or a reverse emulsion; it is generally insoluble in water in the acid form, but it becomes solubilized in water and develops its activity of stabilizing suspensions of zeolites as soon as the carboxyl groups are totally or partially neutralized, the neutralizing agent being preferably sodium, lithium, potassium, ammonium, calcium or magnesium hydroxide, amines or combinations of these agents, or again the natural alkalinity of the medium when it is used in a suspension of zeolites that is alkaline by reason of its manufacturing process.

The copolymers according to the present invention are used in the suspensions of sodium silico-aluminates (containing the sodium silico-aluminate in an amount of 30 to 70%, preferably 40 to 60%, most preferably about 50%, by weight of dry inorganic material per the total weight of the suspension) in a ratio of at most 0.4% by dry weight in relation to the total mass, and preferably between 0.05%, and 0.3%.

Other features of the invention will become apparent in the course of the following descriptions of exemplary embodiments which are given for illustration of the invention and are not intended to be limiting thereof.

EXAMPLES

Example 1

This example groups together tests 1a, 1b and 1c which illustrate a method of preparing adjuvants by direct emulsion copolymerization using a process well known to one skilled in the art.

For this purpose, the following are placed in a reactor equipped with a stirring system, an ascending condenser and a device for introducing the monomers:

| Batch I | |
|---|---|
| Deionized water | 1000 g |
| Sodium lauryl ether sulfate (28%) | 15.6 g |
| Ammonium persulfate | 1.1 g |
| Sodium metabisulfite | 0.11 g |

The medium thus formed is heated to 68° C., then, over approximately 2 hours, while maintaining the temperature at 72°–75° C., is added a batch II consisting of:

| Batch II | |
|---|---|
| Deionized water | 338 g |
| Sodium lauryl ether sulfate (28%) | 13.1 g |
| Non-crosslinking monomers: | |
| methacrylic acid | 277 g |
| ethyl acrylate | 350 g |
| acrylamide | 4.5 g |
| Type (d) crosslinking monomer: | 6.27 g |
| 100% N-methylol acrylamide | |
| Type (c) crosslinking monomer | x g |

All of the components of batch II being subjected to stirring so as to produce a homogeneous preemulsion of the reactants.

Once the addition of batch II to the reactor is completed, the temperature is raised to 80°–82° C. for 30 minutes to complete the conversion of the monomers.

The contents are then cooled down to 20° C. and the dry substances are adjusted to 30% by introducing water, then a liquid having the following characteristics is collected in a flask:

bluish emulsion, absence of precipitate in the liquid, dry content: 30% (measured after drying 1 g for 24 hours at 105° C.)

product water soluble in alkaline medium pH = approximately 4.

Tests 1a and 1b are examples according to the present invention obtained with two different crosslinking systems, while example 1c obtained without a crosslinking monomer of type (c), belongs to the prior art.

Table I hereinafter gives the identities and quantities of the different crosslinking agents used, as well as their percentage in relation to 100 g of monomers.

TABLE I

| | Test 1a (present invention) | | Test 1b (present invention) | | Test 1c (prior art) | |
|---|---|---|---|---|---|---|
| | (1) | (2) | (1) | (2) | (1) | (2) |
| ethylene glycol dimethacrylate | 10.2 | 1.58 | 0 | 0 | 0 | 0 |
| triallylcyanurate | 0 | 0 | 14.4 | 2.2 | 0 | 0 |

(1) Quantities X in grams in the formula.
(2) Quantities in weight percent in relation to the total weight of the monomers.

Example 2

This example groups together tests 2a and 2b which illustrate other polymeric compositions designated as additives in Table II, obtained using another method of polymerization in a non-toxic solvent medium with different monomers of Example 1.

For this purpose, the following products are placed in a 2 liter reactor equipped with a stirrer, an ascending condensor and a dropping funnel:

| 100% Acrylic acid (non-crosslinking monomer) | 99 g |
|---|---|
| Potassium carbonate | 4.8 g |
| Anhydrous ethyl acetate | 900 ml |
| Crosslinking monomer (see tests 2a and 2b) | X g |

The temperature of the mixture is brought to 80° C. and a solution of polymerization initiators of the following composition is then added via the dropping funnel:

| Anhydrous ethyl acetate | 50 ml |
|---|---|
| Lauroyl peroxide | 0.32 g |

Slight exothermia is observed after 3 minutes, while the solution of monomers, hitherto clear, becomes muddy following the formation of a polymer insoluble in the reaction medium.

The temperature is allowed to rise and is then regulated to 82°-83° C., and it is maintained in this range for 5 hours. This is followed by cooling to 20° C.

A suspension of polymer in powder form in the ethyl acetate is then obtained, which is filtered using a Buchner filter so as to separate off the maximum of solvent. The cake obtained is then dried for 12 hours in a ventilated oven maintained at 50° C.

The product obtained after drying is a fine white powder containing more than 99.5% of copolymer constituted by crosslinked polyacrylic acid.

Test 2a: this test, which was conducted under the conditions described above, contained as a crosslinking agent 1 g of triallyl pentaerythritol, i.e. 1% of crosslinking agent in relation to the acrylic acid used constituting the non-crosslinking monomer.

Test 2b: this test, which represents prior art, was carried out under the same conditions without a crosslinking agent.

Example 3

This example illustrates the ability of the polymers obtained according to the present invention to be used in preparing aqueous suspensions, stable in storage and during transport, of sodium silico-aluminates also known as zeolites and, more particularly, A zeolites, whereof zeolite 4A is increasingly used in detergents as a substitute for polyphosphates. Its overall formula is:

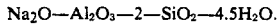

$$Na_2O-Al_2O_3-2-SiO_2-4.5H_2O.$$

For this purpose, suspensions of zeolite 4A were prepared from an industrial filter cake containing 50.5% of dry substances, measured by weight loss for two hours at 800° C.; this cake has the appearance of a very fluid liquid when it is kept stirred, but it settles very quickly and separates into two phases, one liquid and the other resulting in a very hard sediment as soon as it is at rest when it contains no stabilizer. The diameter of the particles of zeolites is between 1 and 10 microns and the suspension has a pH equal to approximately 12.

Procedure 2.5 liters of the homogenous, fluid suspension of zeolites above are poured into a 5 liter beaker and, with the help of a Rayneri type agitating system, different stabilizing agents are incorporated and stirring is maintained for 15 minutes so as to obtain an intimate mixture of the suspension and of the agent tested.

The suspension obtained is immediately divided into five 500 ml samples which are preserved in transparent, hermetic recipients to undergo an ageing cycle.

During this ageing cycle, one of the five samples, and one only, is examined and then disposed of at each of the following five stages:

at the end of preparation, this stage representing time $t=0$, after 4 days at 50° C. in static storage, this stage representing time $t=4$, after 4 days at 50° C. plus 2 days at 20° C., this stage representing time $t=4+2$, after 4 days at 50° C. plus 5 days at 20° C., this stage representing time $t=4+5$, after 4 days at 50° C. plus 11 days at 20° C., this stage representing time $t=4+11$.

At each inspection, the following are evaluated:
the volume percentage of supernatent liquid,
the volume percentage of sediment,
the ability of the suspension to be transferred.

It is considered that an additive is more efficient if it:
is used in small doses,
gives rise to non-existent or small percentages of supernatent liquid and sediment,
gives a suspension that can be transferred easily and completely into a 500 ml beaker.

Table II provides a recapitulation of the additives tested and the results obtained.

The quantities of additives indicated in Table II are expressed as weight percentages of dry additives per 100 grams of 50.5% zeolite suspensions; these quantities are always chosen in such a way that the viscosity of the suspension is less than 2000 centipoises (measured with a No.3 mobile Brookfield RVT viscometer, at 20 rpm), which corresponds to a product that is easy to pump in industrial applications.

TABLE II

| Reference | Dry additive per 100 g of 50.5% suspension | Inspection at $t = 0$ | Volume % Supernatent | Volume % Deposit | Pourability |
|---|---|---|---|---|---|
| P.A. | 0.24% | Test 1c | 0 | 0 | ** |
| P.A. | 1.50% | Oxyethylated isotridecylic alcohol with 4 to 6.5 E.O. | 0 | 0 | ** |
| P.A. | 0.10% | Test 2b | 0 | 0 | ** |
| Inv. | 0.24% | Test 1a | 0 | 0 | ** |
| Inv. | 0.24% | Test 1b | 0 | 0 | ** |
| Inv. | 0.10% | Test 2a | 0 | 0 | ** |

| Reference | Dry additive per 100 g of 50.5% suspension | Inspection at $t = 4$ | Volume % Supernatent | Volume % Deposit | Pourability |
|---|---|---|---|---|---|
| P.A. | 0.24% | Test 1c | 12.8 | 25 | 0 |
| P.A. | 1.50% | Oxyethylated isotridecylic alcohol with 4 to 6.5 E.O. | 8.5 | 6.4 | * |
| P.A. | 0.10% | Test 2b | 12.8 | 32.1 | 0 |
| Inv. | 0.24% | Test 1a | 0 | 0 | ** |
| Inv. | 0.24% | Test 1b | 0 | 0 | ** |
| Inv. | 0.10% | Test 2a | 0 | 0 | ** |

| Reference | Dry additive per 100 g of 50.5% suspension | Inspection at $t = 4 + 2$ | Volume % Supernatent | Volume % Deposit | Pourability |
|---|---|---|---|---|---|
| P.A. | 0.24% | Test 1c | 15.7 | 37.1 | 0 |

TABLE II-continued

| Reference | Dry additive per 100 g of 50.5% suspension | Inspection at | Volume % Supernatent | Volume % Deposit | Pourability |
|---|---|---|---|---|---|
| P.A. | 1.50% | Oxyethylated isotridecylic alcohol with 4 to 6.5 E.O. | 10.7 | 12.8 | * |
| P.A. | 0.10% | Test 2b | 17.1 | 42.8 | 0 |
| Inv. | 0.24% | Test 1a | 1.4 | 0 | ** |
| Inv. | 0.24% | Test 1b | 2.8 | 0 | ** |
| Inv. | 0.10% | Test 2a | 2.8 | 0 | ** |

| Reference | Dry additive per 100 g of 50.5% suspension | Inspection at t = 4 + 5 | Volume % Supernatent | Volume % Deposit | Pourability |
|---|---|---|---|---|---|
| P.A. | 0.24% | Test 1c | 17.8 | 46.4 | 0 |
| P.A. | 1.50% | Oxyethylated isotridecylic alcohol with 4 to 6.5 E.O. | 14.3 | 14.3 | 0 |
| P.A. | 0.10% | Test 2b | 20 | 55.7 | 0 |
| Inv. | 0.24% | Test 1a | 1.4 | 0 | ** |
| Inv. | 0.24% | Test 1b | 3.5 | 0 | ** |
| Inv. | 0.10% | Test 2a | 3.5 | 0 | ** |

| Reference | Dry additive per 100 g of 50.5% suspension | Inspection at t = 4 + 11 | Volume % Supernatent | Volume % Deposit | Pourability |
|---|---|---|---|---|---|
| P.A. | 0.24% | Test 1c | 21.4 | 60 | 0 |
| P.A. | 1.50% | Oxyethylated isotridecylic alcohol with 4 to 6.5 E.O. | 17.8 | 25.7 | 0 |
| P.A. | 0.10% | Test 2b | 21.4 | 71.4 | 0 |
| Inv. | 0.24% | Test 1a | 1.4 | 0 | ** |
| Inv. | 0.24% | Test 1b | 3.5 | 0 | ** |
| Inv. | 0.10% | Test 2a | 3.5 | 5 | ** |

P.A. = Prior Art
Inv. = Present Invention
E.O. = Ethylene oxide
0 = Pourability impossible or incomplete
* = Pourability complete but difficult
** = Pourability complete and immediate Thus, it is clear from this Table II that the acrylic copolymers according to the present invention used at small doses, in all cases less than 0.4% of dry copolymer in relation to the suspension of zeolites, make it possible to obtain extremely stable suspensions, the stability of which is not affected by storage for several days at 50° C. and/or at ambient temperature.

Example 4

The aim of this example is to demonstrate the non-toxic nature of the products according to the present invention.

For this purpose, toxicity tests were carried out orally on rats (LD 50).

The, products obtained in tests 1a and 2a gave results of LD 50 greater than 2000 mg/kg, which corresponds to products of very low toxicity.

Example 5

This example illustrates the behavior during transport of a suspension of zeolites stabilized with an additive according to the present invention and constituting test 1a of Example 1.

For this purpose, 150 kg of a suspension of zeolites were prepared in the same way as in Example 3, 0.24%, i.e. 0.36 kg expressed in terms of dry substance of copolymer 1a being used as a stabilizing agent.

This suspension was transferred to a 120 liter drum, which was sent by truck to a user factory 1350 kilometers from the place of preparation. The transport and storage time prior to use totalled 9 days.

At the time of use, the product proved very easy to pump and no deposit was noted at the bottom of the container, thus confirming the good suitability for transport of suspensions of zeolites stabilized with copolymers according to the invention.

Obviously, numerous modifications and variations of the present invention are possible in light of the above teachings. It is therefore to be understood that, within the scope of the appended claims, the invention may be practiced otherwise than as specifically described herein.

What is new and desired to be secured by Letters Patent of the United States is:

1. A copolymer for stabilizing aqueous suspensions of sodium silico-aluminates or zeolites, wherein said copolymer is crosslinked, soluble in water, at least at pH 7 or above, and consists essentially of:
    (a) at least one non-crosslinking acrylic monomer having a carboxylic function, selected from the group consisting of acrylic and methacrylic acids;
    (b) possibly, at least one non-crosslinking acrylic monomer selected from the group consisting of the esters, amides and nitriles of acrylic and methacrylic acids;
    (c) at least one crosslinking monomer having at least two acrylic and/or allyl and/or vinyl double bonds; and
    (d) possibly, at least one at least bifunctional crosslinking monomer comprising at most one double bond and at least one other chemical function that is reactive with regard to monomers with acid, amide or nitrile functions of said monomers (a) and (b), wherein the total amount of the crosslinking monomers of types (c) and (d) constitute from 1 to 5 weight percent based on the total weight of the monomers and said copolymer contains 15 to 99% by weight, in relation to the total mass of monomers, of acrylic and/or methacrylic acids.

2. The copolymer of claim 1, wherein said acrylic monomer (b) is selected from the group consisting of methyl acrylate, ethyl acrylate, propyl acrylate, butyl acrylate, octyl acrylate, methyl methacrylate, ethyl methacrylate, propyl methacrylate, butyl methacrylate, octyl methyacrylate, acrylamide, methacrylamide, acrylonitrile, methacrylonitrile, N-substituted acrylamides, and N-substituted methacrylamides.

3. The copolymer of claim 1, wherein said crosslinking monomer (c) is selected from the group consisting of ethylene glycol dimethacrylate, allyl acrylate, methylene-bis-acrylamide, tetralllyloxyethane, triallyl cyanurate, and allyl ethers obtained from pentaerythritol, sorbitol, and sucrose.

4. The copolymer of claim 1, wherein said other reactive chemical function of the crosslinking monomer of type (d) is selected from the group consisting of hydroxyl, methylol, isocyanate, amine, epoxy and alkylene carbonate functions.

5. The copolymer of claim 1, which contains, in relation to the total mass of the monomers, from 30 to 99% by weight of acrylic and/or methacrylic acids.

6. The copolymer of claim 1, which contains, in relation to the total mass of the monomers, from 0 to 85% by weight of at least one non-crosslinking acrylic monomer selected from the group consisting of esters, amides and nitriles of acrylic and/or methacrylic acids.

7. The copolymer of claim 1, which contains, in relation to the total mass of the monomers, from 0 to 60% by weight of at least one non-crosslinking acrylic monomer selected from the group consisting of esters, amides, and nitriles of acrylic and/or methacrylic acids.

8. The copolymer of claim 1, wherein the total amount of monomers (c) and (d) is 1 to 4 weight percent based on the total weight of the monomers.

* * * * *

UNITED STATES PATENT AND TRADEMARK OFFICE
CERTIFICATE OF CORRECTION

PATENT NO. : 5,216,100
DATED : June 1, 1993
INVENTOR(S) : Henri Grondin, et al

It is certified that error appears in the above-indentified patent and that said Letters Patent is hereby corrected as shown below:

Column 2, line 1: "Thus, there, remains" should read --Thus, there remains--.

Column 4, line 21: "Type (d) crosslinking monomer: 6.27g" should read --Type (d) crosslinking monomer:--

Column 4, line 22: "100% N-methylol acrylamide" should read --100% N-methylol acrylamide  6.27g--.

Column 4, line 29: "..raised to 80°-82°C. for..." should read --raised to 80°C and all of the contents of the reactor are maintained at 80°-82°C for 30 minutes..--

Column 7, line 53: "The, products" should read --The products--.

Signed and Sealed this

Twenty-second Day of November, 1994

Attest:

BRUCE LEHMAN

*Attesting Officer*   *Commissioner of Patents and Trademarks*